US009882788B2

(12) United States Patent
Ramesh et al.

(10) Patent No.: US 9,882,788 B2
(45) Date of Patent: *Jan. 30, 2018

(54) PROVIDING NETWORK SERVICES BASED ON SERVICE MODE AND SERVICE TYPE (71) Applicant: Extreme Networks, Inc., San Jose, CA (US)

(72) Inventors: Deepak Ramesh, Bangalore (IN); Sudhakar Biradar, Bangalore (IN)

(73) Assignee: Extreme Networks, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/265,736

(22) Filed: Sep. 14, 2016

(65) Prior Publication Data

US 2017/0005885 A1 Jan. 5, 2017

Related U.S. Application Data (63) Continuation of application No. 14/250,651, filed on Apr. 11, 2014, now Pat. No. 9,461,842.

(51) Int. Cl.
*G06F 15/173* (2006.01)
*H04L 12/24* (2006.01)
*H04L 12/46* (2006.01)

(52) U.S. Cl.
CPC ...... *H04L 41/5051* (2013.01); *H04L 12/4662* (2013.01); *H04L 41/0873* (2013.01); *H04L 41/5058* (2013.01)

(58) Field of Classification Search
CPC ............ H04L 12/4662; H04L 41/0873; H04L 41/5051; H04L 41/5058
See application file for complete search history.

(56) References Cited

U.S. PATENT DOCUMENTS

| 8,583,753 | B1 * | 11/2013 | Bhagwatula | ............ H04L 67/16 709/208 |
| 8,874,709 | B2 * | 10/2014 | Ashwood-Smith | . H04L 12/2852 370/230 |
| 2008/0228901 | A1 * | 9/2008 | Choi | ................... H04L 41/0803 709/220 |
| 2010/0281106 | A1 * | 11/2010 | Ashwood-Smith | . H04L 12/2852 709/203 |

(Continued)

Primary Examiner — Mohamed Wasel
(74) Attorney, Agent, or Firm — Haley Guiliano LLP (57) ABSTRACT Implementations generally relate to network services. In some implementations, a method includes providing a network service having a service mode and a service type. The method further includes generating a network service advertisement message including a service identifier, a service mode portion, and a service type portion. The method further includes-forwarding the network service advertisement message from a first system to one or more other systems via a network. The method further includes-incrementing a counter corresponding to a service mode and a service type pair of each network service advertisement message having a same service identifier. The method further includes, when the counter corresponding to a service mode and a service type pair reaches a predetermined value, blocking configuration of another service having the same service identifier value, service mode and service type as that corresponding to the counter that reached the predetermined value.

20 Claims, 5 Drawing Sheets (56) References Cited

U.S. PATENT DOCUMENTS

| | | | | |
|---|---|---|---|---|
| 2011/0153773 A1* | 6/2011 | Vandwalle | ............ | H04W 8/005 |
| | | | | 709/217 |
| 2013/0195111 A1* | 8/2013 | Allan | .................... | H04L 12/462 |
| | | | | 370/395.53 |
| 2014/0160924 A1* | 6/2014 | Pfautz | ................. | H04L 47/2441 |
| | | | | 370/235 |
| 2014/0204762 A1* | 7/2014 | Allan | ....................... | H04L 45/12 |
| | | | | 370/238 |
| 2015/0280986 A1* | 10/2015 | Abuan | ................. | H04L 67/141 |
| | | | | 709/221 |
| 2016/0006650 A1* | 1/2016 | Song | .................. | H04L 12/6418 |
| | | | | 370/329 |

* cited by examiner

PROVIDING NETWORK SERVICES BASED ON SERVICE MODE AND SERVICE TYPE

CROSS-REFERENCE TO RELATED APPLICATIONS

This application is a continuation of U.S. application Ser. No. 14/250,651 filed Apr. 11, 2014, the disclosure of which is expressly incorporated herein by reference in its entirety.

TECHNICAL FIELD

Embodiments relate generally to computer networks, and more particularly, to methods, systems and computer readable media for advertising network service (e.g., ISID) type and mode.

BACKGROUND

In some existing networks, it may be difficult or impossible to determine if a given service (e.g., ISID) is configured as an E-LINE ISID on a backbone edge bridge (BEB) and as an E-LAN ISID on another BEB. Thus, issues can arise in which an E-LINE ISID that is supposed to have only two endpoints in an entire network can end up with more than two endpoints due to misconfiguration. Also, for example, an ISID may be mapped as an E-LINE ISID on one BEB and as an E-LAN ISID on another BEB and there may be no automatic technique or method to prevent this misconfiguration.

Embodiments were conceived in light of the above mentioned needs, problems and/or limitations, among other things.

SUMMARY

One or more embodiments can include methods, systems and computer readable media for advertising service type and in a network (e.g., in an SPBm, or shortest path bridging Mac-in-Mac, network). In some implementations, the method can include providing a network service having a service mode and a service type, and generating a network service advertisement message including a service identifier, a service mode portion and a service type portion. The method can also include populating the service mode portion with a first value corresponding to a service mode of the network service and populating the service type portion with a second value corresponding to a service type of the network service. The method can further include forwarding the network service advertisement message from a first system to one or more other systems via a network.

The method can also include receiving one or more inbound network service advertisement messages from the one or more other systems, and comparing a service identifier value of each inbound service advertisement message to determine if any network service advertisement messages have a same service identifier. The method can further include incrementing a counter corresponding to a service mode and a service type pair of each network service advertisement message having a same service identifier. The method can also include, when the counter corresponding to a service mode and a service type pair reaches a predetermined value, blocking configuration of another service having the same service identifier value, service mode and service type as that corresponding to the counter that reached the predetermined value.

The method can also include receiving a request to configure a new network service, the request including a new network service identifier, a new service type and a new service mode. The method can further include determining whether any existing network services have a service identifier matching the new service identifier. When an existing network service has a matching service identifier, comparing a service mode and a service type of the existing network service to the new service type and the new service mode of the new network service request. The method can also include blocking the request to configure the new network service based on a result of the comparing.

Some implementations can include a system comprising one or more processors configured to perform operations. The operations can include providing a network service having a service mode and a service type, and generating a network service advertisement message including a service identifier, a service mode portion and a service type portion. The operations can also include populating the service mode portion with a first value corresponding to a service mode of the network service and populating the service type portion with a second value corresponding to a service type of the network service. The operations can further include forwarding the network service advertisement message from a first system to one or more other systems via a network.

The operations can also include receiving one or more inbound network service advertisement messages from the one or more other systems, and comparing a service identifier value of each inbound service advertisement message to determine if any network service advertisement messages have a same service identifier. The operations can further include incrementing a counter corresponding to a service mode and a service type pair of each network service advertisement message having a same service identifier. When the counter corresponding to a service mode and a service type pair reaches a predetermined value, blocking configuration of another service having the same service identifier value, service mode and service type as that corresponding to the counter that reached the predetermined value.

The operations can also include receiving a request to configure a new network service, the request including a new network service identifier, a new service type and a new service mode, and determining whether any existing network services have a service identifier matching the new service identifier. The operations can further include, when an existing network service has a matching service identifier, comparing a service mode and a service type of the existing network service to the new service type and the new service mode of the new network service request. The operations can also include blocking the request to configure the new network service based on a result of the comparing.

Some implementations can include a nontransitory computer readable medium having stored thereon software instructions that, when executed by a processor, cause the processor to perform operations. The operations can include providing a network service having a service mode and a service type, and generating a network service advertisement message including a service identifier, a service mode portion and a service type portion. The operations can also include populating the service mode portion with a first value corresponding to a service mode of the network service and populating the service type portion with a second value corresponding to a service type of the network service. The operations can further include forwarding the network service advertisement message from a first system to one or more other systems via a network.

The operations can also include receiving one or more inbound network service advertisement messages from the one or more other systems, and comparing a service identifier value of each inbound service advertisement message to determine if any network service advertisement messages have a same service identifier. The operations can further include incrementing a counter corresponding to a service mode and a service type pair of each network service advertisement message having a same service identifier. When the counter corresponding to a service mode and a service type pair reaches a predetermined value, blocking configuration of another service having the same service identifier value, service mode and service type as that corresponding to the counter that reached the predetermined value.

The operations can also include receiving a request to configure a new network service, the request including a new network service identifier, a new service type and a new service mode, and determining whether any existing network services have a service identifier matching the new service identifier. The operations can further include, when an existing network service has a matching service identifier, comparing a service mode and a service type of the existing network service to the new service type and the new service mode of the new network service request. The operations can also include blocking the request to configure the new network service based on a result of the comparing.

In any of the above-mentioned implementations, the service mode can include one of E-LINE, E-LAN and E-TREE. Also, the service type is one of CVLAN UNI, transparent UNI, Switched-UNI, Promiscuous ISID, and Isolated ISID. The network can include an SPBm network. The network service advertisement message can be sent via ISIS. The predetermined value can be two and the network service mode can include E-LINE.

DETAILED DESCRIPTION

Example implementations are discussed herein in terms of E-LINE and E-LAN. However, it will be appreciated that an implementation can be configured for other services such as Ethernet Private Line (EPL), Ethernet Virtual Private Line (EVPL) or the like. In general, an implementation can be used for virtual connections between a pair of user-network interfaces (UNIs) or for point-to-pint type systems.

Figure 1:
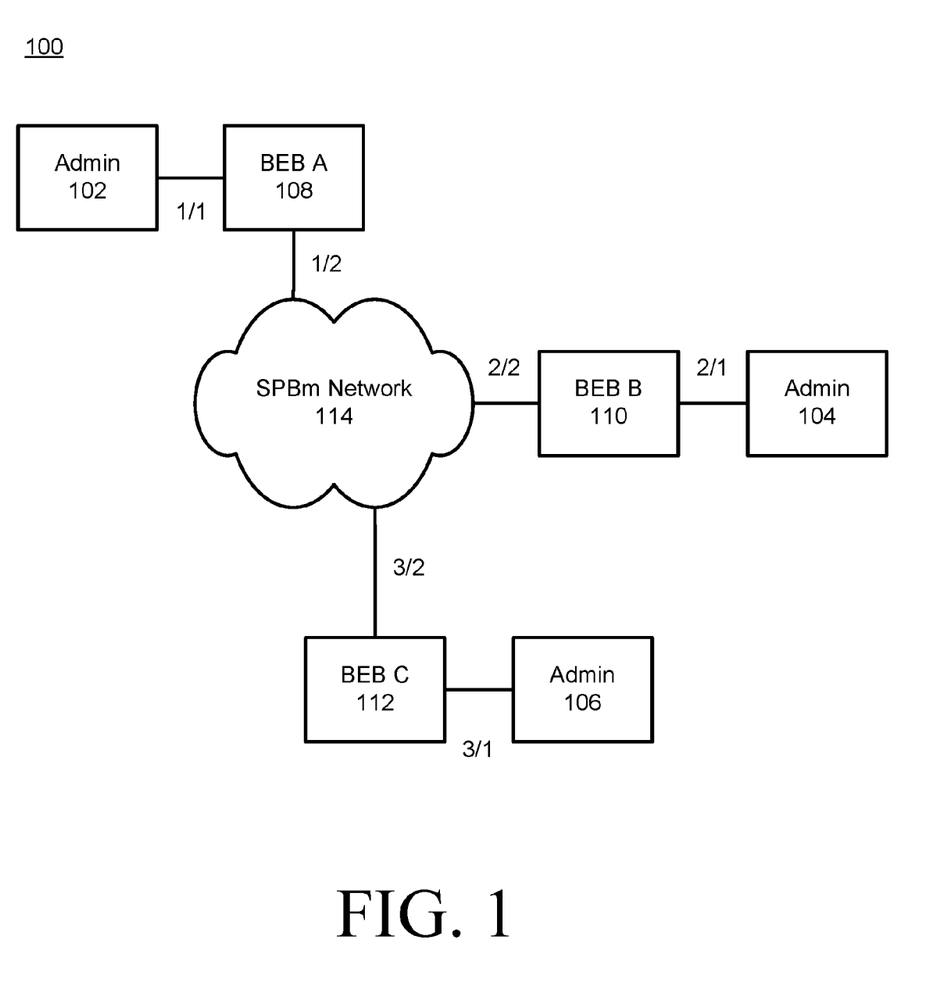
FIG. 1 is a diagram of an example system for service type and mode advertisement access in accordance with at least one implementation.

As shown in FIG. 1, an example system 100 includes a plurality of administration systems (102-106), a plurality of bridging systems (e.g., BEBs) (108-112) and a network 114 (e.g., an SPBm network).

In operation, for example, on BEB A (108) an E-LINE ISID can be configured. The E-LINE ISID can have ISID 10 (e.g., service identifier 10) and the E-LINE ISID can be associated to port 1/1.

BEB-A (108) can be configured to scan through a list of configured ISIDs and ISIDs discovered via ISIS. If ISID entries with the same ISID value are found, then BEB-A compares the service mode and type of the ISID from the ISID identifier sub-TLV. For example, the service identifier or advertisement message can include a sub-TLV having a service mode portion (e.g., 4 bits) and a service type portion (e.g., 4 bits) located after the ISID value. For example, the service mode values can include 0—E-LINE, 1—E-LAN, 2—E-TREE. The service types can include 0—CVLAN UNI, 1—transparent UNI, 2—switched UNI, 3—promiscuous ISID and 4—isolated ISID.

If the service type and mode match with a present entry, then increment a counter corresponding to the ISID, mode and type combination. If the counter reaches a predetermined value (e.g., 2, indicating that two end points already exist for the E-LINE ISID in the SPBm network), the system can block (or prevent) a user from configuring the ISID. The system can also optionally display an error message, such as "Two end points already exist for E-LINE ISID 10 in the SPB network." The above-mentioned operations performed on BEB-A can be repeated on BEB-B and BEB-C.

Figure 2:
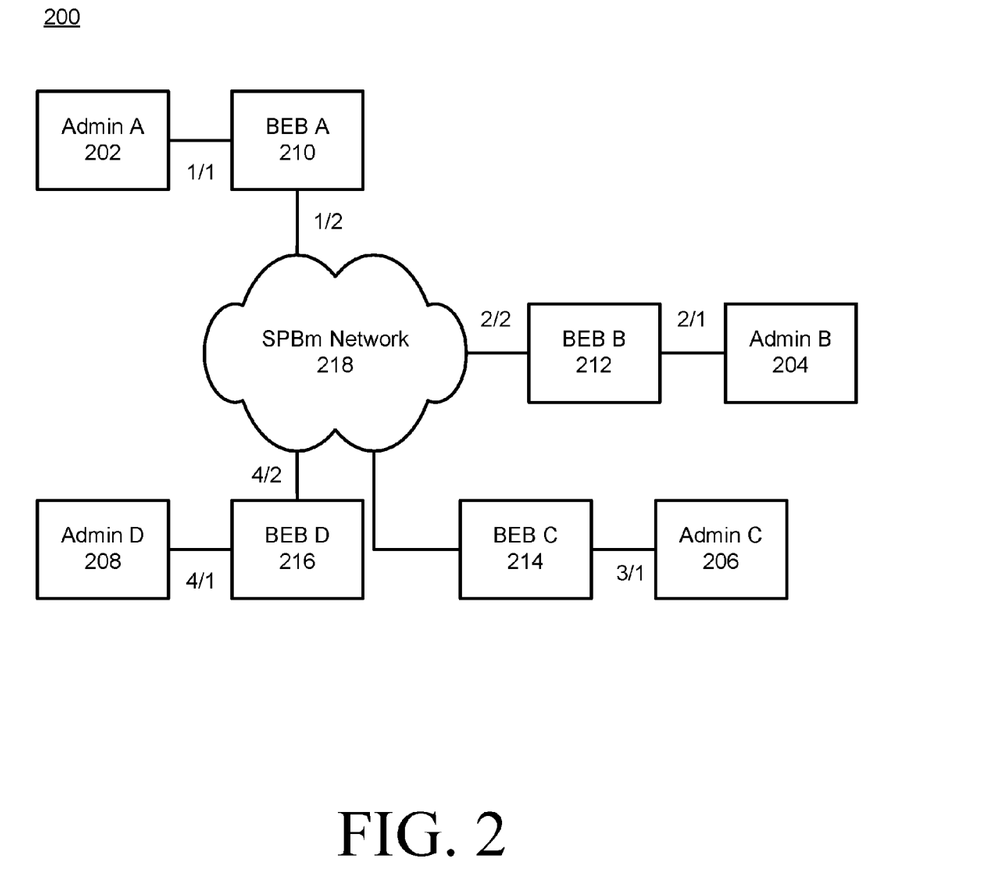
FIG. 2 is a diagram of an example system for service type and mode advertisement access in accordance with at least one implementation.

FIG. 2 shows another example network 200 for an E-LAN ISID. The network 200 includes a plurality of administration systems 202-208, a plurality of bridging systems 210-216, and a network 218 (e.g., an SPB network).

In operation, BEB-A 202 configures CVLAN UNI 10 and associates it with ISID 100. BEB-B 204 configures a transparent UNI ISID 100 and associates the transparent UNI ISID to port 2/1. BEB-C 206 creates a switched UNI ISID 100 and associates the switched UNI ISID with port 3/1. BEB-D 208 configures an E-TREE ISID 100 and associates it to port 4/1.

Each BEB can be configured to scan through a list of configured ISIDs and ISIDs discovered via ISIS packet exchange. If ISID entries with the same ISID value are found, then the mode and type of service values from the ISID sub-TLV are compared.

If there is a mismatch in the mode, then the system can provide a message for display such as "Inconsistent ISID modes configured." If a mode matches, then the system can compare ISID types. If there is a mismatch in the ISID type, then block the user from configuring the ISID and optionally provide an error message for display, such as "Incompatible ISID types".

Figure 3:
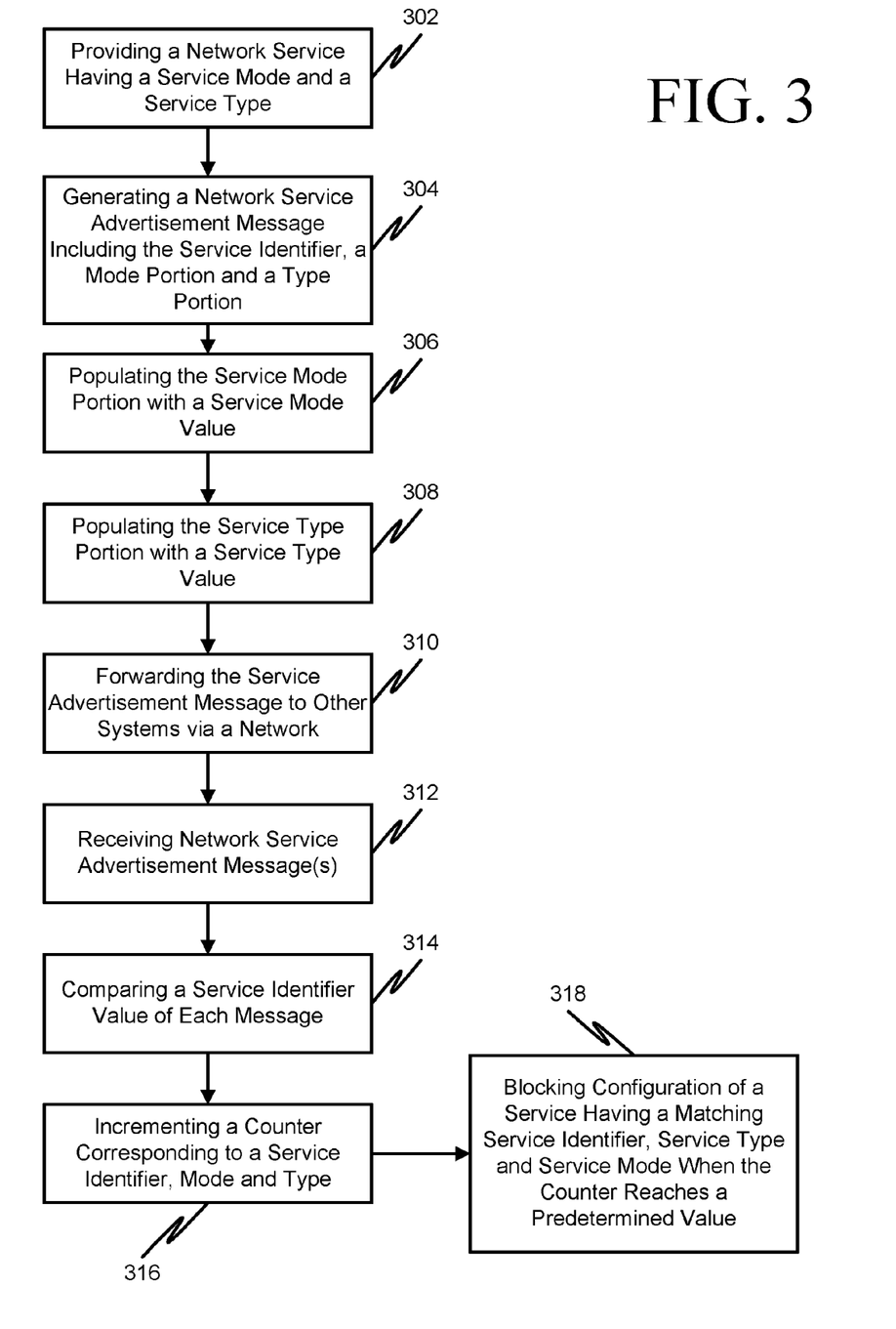
FIG. 3 is a flowchart of an example method for service type and mode advertisement access in accordance with at least one implementation.

FIG. 3 is a flowchart of an example method for service type and mode advertisement access in accordance with at least one implementation. Processing begins at 302, where a network service is provided. The service having a mode and a type. Processing continues to 304.

At 304, a network service advertisement message is generated. The message can include a service identifier, a mode portion and a type portion. The mode portion and type portion can be included as part of an ISID sub-TLV. Processing continues to 306.

At 306, the service mode portion is populated with a value representing the service mode of the network service. Processing continues to 308.

At 308, the service type portion is populated with a value representing the service type of the network service. Processing continues to 310.

At 310, the service advertisement message is forwarded to other systems (e.g., other BEBs) via a network. Processing continues to 312.

At 312, inbound network service advertising messages are received. Processing continues to 314.

At 314, a service identifier value of each received message is compared with known service identifiers. Processing continues to 316.

At 316, a counter for each service mode, service type pair is incremented. Processing continues to 318.

At 318, configuration of a service having a matching service identifier, service type and service mode is blocked when the counter reaches a predetermined value (e.g., 2).

Figure 4:
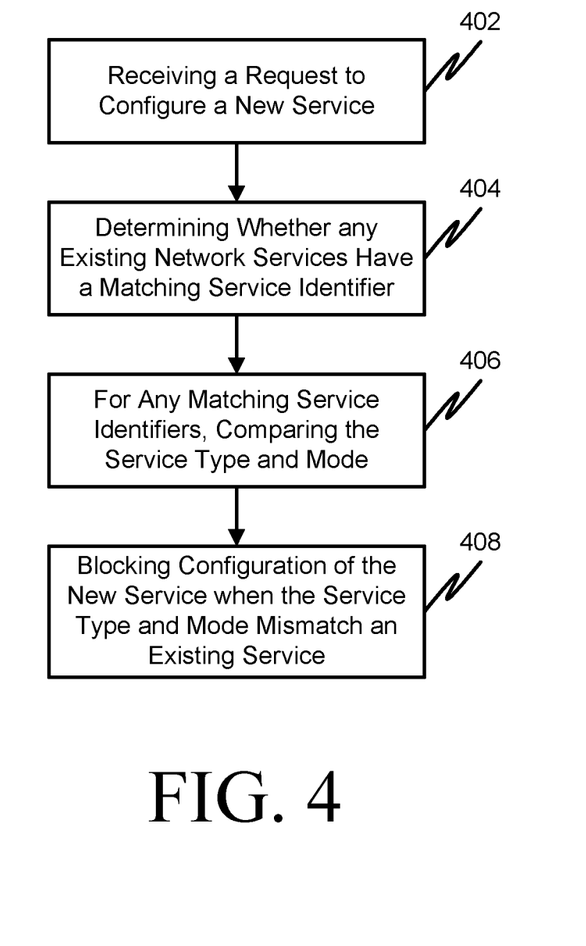
FIG. 4 is a flowchart of an example method for service type and mode advertisement access in accordance with at least one implementation.

FIG. 4 is a flowchart of an example method for service type and mode advertisement access in accordance with at least one implementation. Processing begins at 402, where a request to configure a new service is received. Processing continues to 404.

At 404, the system determines whether any existing network services have a matching service identifier. Processing continues to 406.

At 406, for any matching service identifiers, the service type and mode are compared. Processing continues to 408.

At 408, configuration of the new service is blocked when the service type and mode mismatch an existing service.

It will be appreciated that the above steps can be repeated in whole or in part in order to accomplish a contemplated service advertising task.

Figure 5:
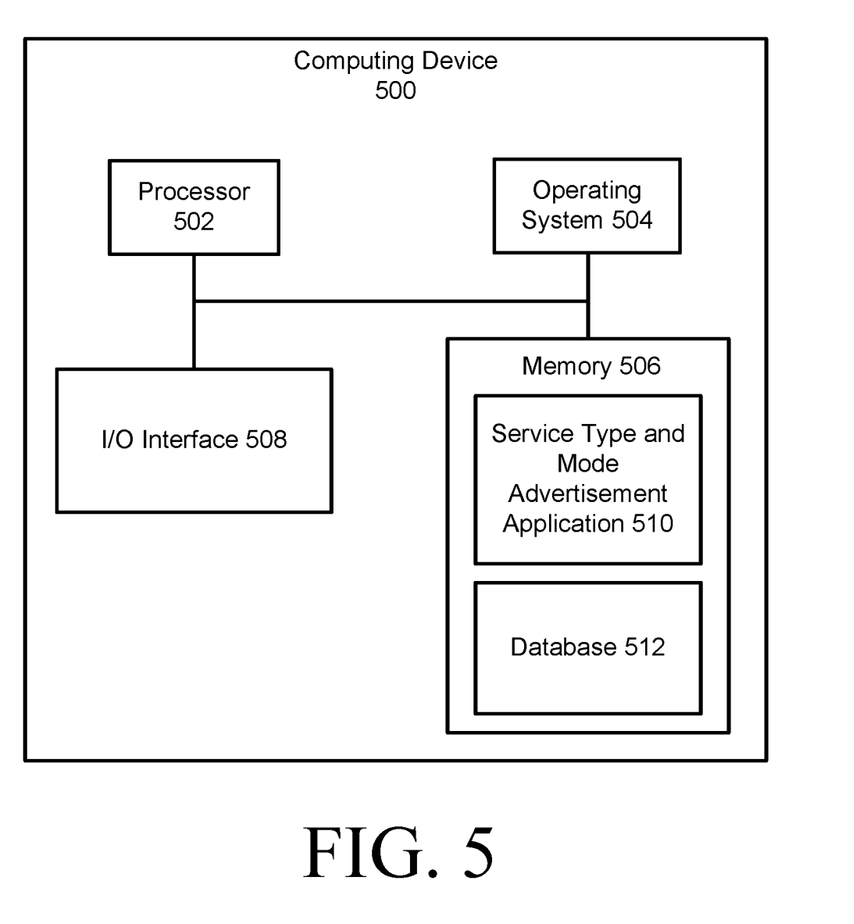
FIG. 5 is a diagram of an example computer system for providing and managing wireless guest access in accordance with at least one implementation.

FIG. 5 is a diagram of an example computer system 500 in accordance with at least one implementation. The computer system 500 includes a processor 502, an operating system 504, a memory 506 and an I/O interface 508. The memory 506 can include an application for network service type and mode advertisement 510 and a database 512 (e.g., for storing advertised service types and modes or the like).

In operation, the processor 502 may execute the application 510 stored in the memory 506. The application 510 can include software instructions that, when executed by the processor, cause the processor to perform operations for network service type and mode advertisement in accordance with the present disclosure (e.g., performing one or more of steps 302-318 and/or 402-408).

The application program 510 can operate in conjunction with the database 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a network bridging device, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Java language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for network service type and mode advertisement.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   providing a network service having a service mode and a service type;
   generating a network service advertisement message including a service identifier, a service mode portion, and a service type portion;
   forwarding the network service advertisement message from a first system to one or more other systems via a network; and
   incrementing a counter corresponding to a service mode and a service type pair of each network service advertisement message having a same service identifier; and
   when the counter corresponding to a service mode and a service type pair reaches a predetermined value, blocking configuration of another service having the same service identifier value, service mode, and service type as that corresponding to the counter that reached the predetermined value.

2. The method of claim 1, further comprising:
   populating the service mode portion with a first value corresponding to a service mode of the network service; and
   populating the service type portion with a second value corresponding to a service type of the network service.

3. The method of claim 1, further comprising:
   receiving one or more inbound network service advertisement messages from the one or more other systems; and
   comparing a service identifier value of each inbound service advertisement message to determine if any network service advertisement messages have a same service identifier.

4. The method of claim 1, further comprising:
   receiving a request to configure a new network service, wherein the request includes a new network service identifier, a new service type, and a new service mode;
   determining whether any existing network services have a service identifier matching the new service identifier;
   when an existing network service has a matching service identifier, comparing a service mode and a service type of the existing network service to the new service type and the new service mode of the new network service request; and
   blocking the request to configure the new network service based on a result of the comparing.

5. The method of claim 1, wherein the predetermined value is two and the service mode includes an Ethernet line (E-LINE).

6. The method of claim 1, wherein the service mode is one of Ethernet line (E-LINE), Ethernet local area network (E-LAN) and Ethernet tree (E-TREE).

7. The method of claim 1, wherein the service type is one of customer virtual local area network (CVLAN) user network interface (UNI), transparent UNI, switched UNI, promiscuous service identifier (ISID), and isolated ISID.

8. A system comprising:
   one or more processors; and
   logic encoded in one or more non-transitory computer-readable storage media for execution by the one or more processors and when executed operable to perform operations comprising:
   providing a network service having a service mode and a service type;
   generating a network service advertisement message including a service identifier, a service mode portion, and a service type portion;
   forwarding the network service advertisement message from a first system to one or more other systems via a network; and
   incrementing a counter corresponding to a service mode and a service type pair of each network service advertisement message having a same service identifier; and
   when the counter corresponding to a service mode and a service type pair reaches a predetermined value, blocking configuration of another service having the same service identifier value, service mode, and service type as that corresponding to the counter that reached the predetermined value.

9. The system of claim 8, wherein the logic when executed is further operable to perform operations comprising:
   populating the service mode portion with a first value corresponding to a service mode of the network service; and
   populating the service type portion with a second value corresponding to a service type of the network service.

10. The system of claim 8, wherein the logic when executed is further operable to perform operations comprising:
    receiving one or more inbound network service advertisement messages from the one or more other systems; and
    comparing a service identifier value of each inbound service advertisement message to determine if any network service advertisement messages have a same service identifier.

11. The system of claim 8, wherein the logic when executed is further operable to perform operations comprising:
    receiving a request to configure a new network service, wherein the request includes a new network service identifier, a new service type, and a new service mode;
    determining whether any existing network services have a service identifier matching the new service identifier;
    when an existing network service has a matching service identifier, comparing a service mode and a service type of the existing network service to the new service type and the new service mode of the new network service request; and
    blocking the request to configure the new network service based on a result of the comparing.

12. The system of claim 8, wherein the predetermined value is two and the service mode includes an Ethernet line (E-LINE).

13. The system of claim 8, wherein the service mode is one of Ethernet line (E-LINE), Ethernet local area network (E-LAN) and Ethernet tree (E-TREE).

14. The system of claim 8, wherein the service type is one of customer virtual local area network (CVLAN) user network interface (UNI), transparent UNI, switched UNI, promiscuous service identifier (ISID), and isolated ISID.

15. A non-transitory computer-readable medium having stored thereon software instructions that, when executed by one or more processors, cause the one or more processors to perform operations including:
providing a network service having a service mode and a service type;
generating a network service advertisement message including a service identifier, a service mode portion, and a service type portion;
forwarding the network service advertisement message from a first system to one or more other systems via a network; and
incrementing a counter corresponding to a service mode and a service type pair of each network service advertisement message having a same service identifier; and
when the counter corresponding to a service mode and a service type pair reaches a predetermined value, blocking configuration of another service having the same service identifier value, service mode, and service type as that corresponding to the counter that reached the predetermined value.

16. The computer-readable storage medium of claim 15, wherein the instructions when executed further cause the one or more processors to perform operations comprising:
populating the service mode portion with a first value corresponding to a service mode of the network service; and
populating the service type portion with a second value corresponding to a service type of the network service.

17. The computer-readable storage medium of claim 15, wherein the instructions when executed further cause the one or more processors to perform operations comprising:
receiving one or more inbound network service advertisement messages from the one or more other systems; and
comparing a service identifier value of each inbound service advertisement message to determine if any network service advertisement messages have a same service identifier.

18. The computer-readable storage medium of claim 15, wherein the instructions when executed further cause the one or more processors to perform operations comprising:
receiving a request to configure a new network service, wherein the request includes a new network service identifier, a new service type, and a new service mode;
determining whether any existing network services have a service identifier matching the new service identifier;
when an existing network service has a matching service identifier, comparing a service mode and a service type of the existing network service to the new service type and the new service mode of the new network service request; and
blocking the request to configure the new network service based on a result of the comparing.

19. The computer-readable storage medium of claim 15, wherein the predetermined value is two and the service mode includes an Ethernet line (E-LINE).

20. The computer-readable storage medium of claim 15, wherein the service mode is one of Ethernet line (E-LINE), Ethernet local area network (E-LAN) and Ethernet tree (E-TREE).

* * * * *